(12) United States Patent
Ichimura

(10) Patent No.: US 6,912,803 B2
(45) Date of Patent: Jul. 5, 2005

(54) FAILURE DETECTION DEVICE FOR HYDRAULIC MOTOR AND HYDRAULIC DRIVE VEHICLE

(75) Inventor: Kazuhiro Ichimura, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 16 days.

(21) Appl. No.: 10/466,471
(22) PCT Filed: Jan. 19, 2001
(86) PCT No.: PCT/JP01/00368
§ 371 (c)(1), (2), (4) Date: Jul. 16, 2003
(87) PCT Pub. No.: WO02/057662
PCT Pub. Date: Jul. 25, 2002

(65) Prior Publication Data
US 2004/0060206 A1 Apr. 1, 2004

(51) Int. Cl.⁷ .............................. E02F 5/02; G05D 1/02
(52) U.S. Cl. ............................................. 37/348; 60/420
(58) Field of Search ........................ 37/348, 347, 410, 37/414, 466; 60/400, 420, 431; 172/2–11

(56) References Cited

FOREIGN PATENT DOCUMENTS

| JP | 49-61775 | 6/1974 |
|----|----------|--------|
| JP | 50-16231 | 2/1975 |
| JP | U 58-116853 | 8/1983 |
| JP | A 63-150440 | 6/1988 |
| JP | A 4-238740 | 8/1992 |
| JP | A 4-258570 | 9/1992 |
| JP | U 5-96623 | 12/1993 |
| JP | A 6-134833 | 5/1994 |
| JP | A 6-183282 | 7/1994 |
| JP | A 8-282978 | 10/1996 |
| JP | A 09-193108 | 7/1997 |
| JP | A 09-216792 | 8/1997 |
| JP | A 10-121963 | 5/1998 |
| JP | A 2000-234535 | 8/2000 |

OTHER PUBLICATIONS

U.S. Appl. No. 10/950,945, filed Jun. 18, 2003, Ichimura et al.

U.S. Appl. No. 10/466,451, filed Jul. 16, 2003, Ichimura.

*Primary Examiner*—Robert E Pezzuto
(74) *Attorney, Agent, or Firm*—Oliff & Berridge, PLC

(57) ABSTRACT

A failure detection device for a hydraulic motor according to the present comprises a hydraulic pump (3) that is driven by a prime mover (2); a hydraulic motor (1) that is driven by hydraulic oil discharged from the hydraulic pump (3); an abnormality detection device (35) that detects a sign of abnormal operation of the hydraulic motor (1); and a warning device (39, 40) that issues a warning when the sign of the abnormal operation of the hydraulic motor (1) is detected by the abnormality detection device (35).

22 Claims, 16 Drawing Sheets

US 6,912,803 B2

FAILURE DETECTION DEVICE FOR HYDRAULIC MOTOR AND HYDRAULIC DRIVE VEHICLE

This application is a 371 of PCT/JP01/00368 Jan. 19, 2001.

TECHNICAL FIELD

This invention relates to a device that detects a failure of the hydraulic motor installed in the hydraulic drive vehicle such as a wheeled hydraulic excavator.

BACKGROUND ART

Generally, the hydraulic drive vehicle such as a wheeled hydraulic excavator comprises a hydraulic pump, and a hydraulic motor for travelling which is driven by oil discharged from the hydraulic pump. The output shaft of this hydraulic motor is connected with the input shaft of the transmission, and the rotation of the hydraulic motor is transmitted to the wheels through the transmission. A drain chamber is provided to the hydraulic motor, and the drain oil from the hydraulic motor returns to a reservoir via the drain chamber.

In such a hydraulic drive vehicle as described above, if the hydraulic components or an oil cooler, for example, get damaged, which causes the temperature of pressure oil to be supplied to the hydraulic motor to become high, the viscosity of the pressure oil lowers and the hydraulic motor may be prevented from its proper operation. In this case, there is a possibility that the hydraulic motor may get damaged. If the hydraulic motor is damaged, the discharged oil from the hydraulic pump flows into the drain chamber, and in some cases, it flows into the transmission. As a result, the transmission is filled with the oil therein, and a great resistance comes to act on the transmission so that the travelling performance of the vehicle deteriorates. Moreover, when transmission oil becomes mixed with the oil from the hydraulic motor, the property of the transmission oil may be deteriorated, and this may exert a negative influence upon the operation of the transmission.

DISCLOSURE OF THE INVENTION

The present invention is to provide a failure detection device for a hydraulic motor that detects an abnormal operation of the hydraulic motor at early stages to suppress damage of the hydraulic motor and negative consequences from this damage to the minimum.

Moreover, the present invention is to provide a hydraulic drive vehicle which is equipped with such a failure detection device for a hydraulic motor.

In order to achieve the above described object a failure detection device for a hydraulic motor according to the present invention comprises a hydraulic pump that is driven by a prime mover; a hydraulic motor that is driven by hydraulic oil discharged from the hydraulic pump; an abnormality detection device that detects a sign of abnormal operation of the hydraulic motor; and a warning device that issues a warning when the sign of the abnormal operation of the hydraulic motor is detected by the abnormality detection device.

Furthermore, a hydraulic drive vehicle according to the present invention comprises a hydraulic pump that is driven by a prime mover; a hydraulic motor for traveling that is driven by hydraulic oil discharged from the hydraulic pump; an abnormality detection device that detects a sign of abnormal operation of the hydraulic motor for traveling; and a warning device that issues a warning when the sign of the abnormal operation of the hydraulic motor for traveling is detected by the abnormality detection device.

Therefore, it is possible for an operator to recognize an abnormal state of the hydraulic motor at an early stage so that damage upon the hydraulic motor and negative effects attributable to the damage can me minimized.

It is also acceptable to restrict a driving of the hydraulic motor instead of issuing a warning. The hydraulic motor may be a hydraulic motor for traveling, and it is desirable to lower the rotational speed of the prime mover when the sign of the abnormal operation of the hydraulic motor for traveling is detected. It is also acceptable to prevent the vehicle from traveling and to apply a brake when the vehicle has stopped. Furthermore, it is desirable to prevent a restarting of the prime mover when the sign of the abnormal operation of the hydraulic motor for traveling is detected. In addition, a warning may be issued as well.

The sign of the abnormal operation of the hydraulic motor can be detected based upon a temperature of drain oil from the hydraulic motor, a rotational speed of the hydraulic motor, or an inlet pressure of the hydraulic motor.

It is possible to disable the warning device from issuing the warning or to disable a drive restriction on the vehicle when the working state is detected.

It is desirable to reset the above-described control in response to a reset command. The reset command may be issued upon stopping of the prime mover.

BEST MODE FOR CARRYING OUT THE INVENTION

First Embodiment

A wheeled hydraulic excavator that is equipped with a failure detection device according to the first embodiment of the present invention will now be described with reference to FIGS. 1 through 4. The wheeled hydraulic excavator comprises a wheeled undercarriage upon which an upper-structure is rotatably mounted, and a working attachment is fitted to this upper-structure. A hydraulic motor 1 for traveling which is driven by a hydraulic circuit for traveling shown in the FIG. 1 is provided in the undercarriage.

Figure 1:
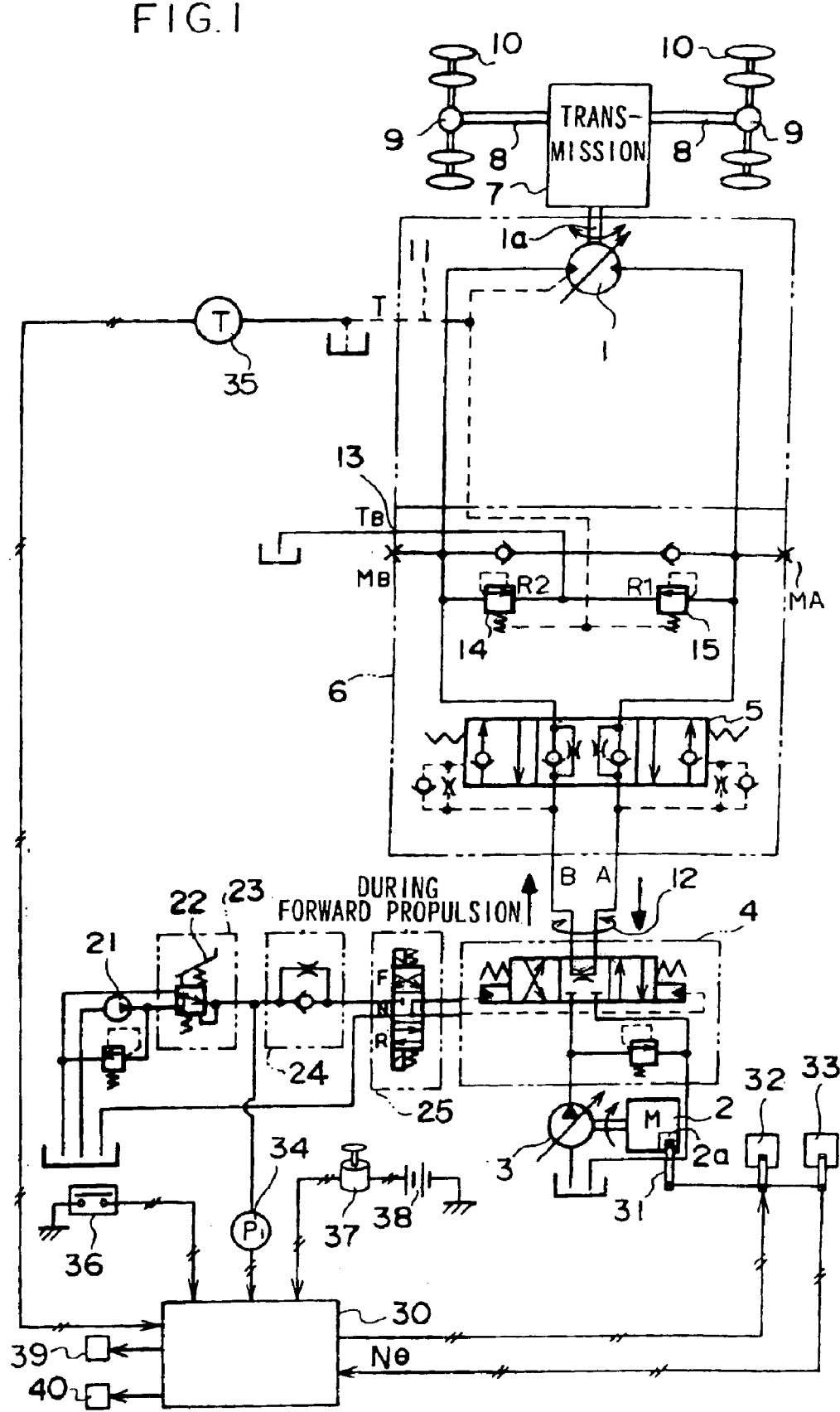
FIG. 1 is a circuit diagram showing the structure of the wheeled hydraulic excavator equipped with the failure detection device for a hydraulic motor according to the first embodiment of the present invention.

As shown in FIG. 1, hydraulic oil is discharged from a main pump 3 which is driven by an engine, the direction and flow rate of the discharged oil are controlled by a control valve 4, and then the hydraulic oil is supplied to a traveling motor 1 via a brake valve 6 with a built-in counterbalance valve 5. A transmission 7 is connected with an output shaft 1a of the traveling motor 1. The rotational speed of the traveling motor 1 is changed by the transmission 7, and is transmitted to tires 10 through propeller shafts 8 and axles 9. Thus, the wheeled hydraulic excavator is propelled. At this time, the leakage oil from the traveling motor 1 is collected to a reservoir through a drain line (drain chamber) 11. It should be noted that the pressure oil from the main pump 3 is also supplied to a hydraulic circuit for working which is not shown in the figure, and drives actuators for working. The direction of changeover and operation amount of the control valve 4 are controlled by pilot pressure from a pilot control circuit. The traveling speed of the vehicle can be controlled by controlling the amount by which the control valve 4 is operated. The pilot control circuit comprises a pilot pump 21, a traveling pilot valve 23 that generates a secondary pilot pressure P1 according to the amount by which an accelerator pedal 22 is stepped upon, a slow-return valve 24 that delays oil returning to the pilot valve 23, and a forward/reverse switchover valve 25 which is used for selecting forward traveling, reverse traveling or neutral for the vehicle. The forward/reverse switchover valve 25 is constituted of a solenoid-controlled directional control valve, and its position is changed over by operating a switch not shown in the figures.

FIG. 1 shows the situation with the forward/reverse switchover valve 25 in its neutral (N) position, and moreover when the traveling pilot valve 23 is not being operated. Accordingly, the control valve 4 is in its neutral position, the pressure oil from the main pump 3 returns to the reservoir, and the vehicle remains stopped. When the forward/reverse switchover valve 25 is switched to its forward traveling position (F position) or to its reverse traveling position (R position) by the operation of the switch, and then the accelerator pedal 22 is stepped upon, the secondary pressure P1 according to the amount by which the accelerator pedal is operated acts on a pilot port of the control valve 4. The control valve 4 is operated by the operation amount corresponding to the secondary pilot pressure P1. Thus, the discharged oil from the main pump 3 is led to the traveling motor 1 via the control valve 4, a center joint 12 and the brake valve 6, so as to drive the traveling motor 1. At this time, the leakage oil from the traveling motor 1 is collected to the reservoir through a drain line (drain chamber) 11.

When the accelerator pedal 22 is released during vehicle traveling, the pressure oil from the pilot pump 21 is interrupted by the traveling pilot valve 23, and an outlet port of the traveling valve is connected to the reservoir. As a result, the pressure oil having acted on the pilot port of control valve 4 returns to the reservoir via the forward/backward switchover valve 25, the slow return valve 24 and the traveling pilot valve 23. At this time, the returning oil flow is restricted by the restriction of the slow return valve 24, so that the control valve 4 returns to its neutral position gradually. When the control valve 4 returns to its neutral position, the supply of the pressure oil (drive pressure) is interrupted, and the counterbalance valve 5 is then switched to its neutral position as shown in FIG. 1.

At this time, the vehicle continues to progress due to its inertia force, and the operation of the traveling motor 1 changes over from motor action to pump action, in which its B port is its suction (inlet) port and its A port is its discharge (outlet) port in FIG. 1. Flow of the pressure oil from the traveling motor 1 is restricted by the restriction of the counterbalance valve 5 (neutral restriction), the pressure between the counterbalance valve 5 and the traveling motor 1 then rises and acts on the traveling motor 1 as brake pressure. As a result, the traveling motor 1 generates the brake torque to slow the vehicle down. If, during the pump operation, the quantity of oil flowing into the traveling motor 1 becomes insufficient, the additional oil is supplied from a make-up port 13 thereto. The maximum brake pressure is regulated by relief valves 14 and 15.

A governor 2a of the engine 2 is connected with a pulse motor 32 via a link mechanism 31, and the rotational speed of engine 2 is controlled by rotation of the pulse motor 32. In particular, the engine speed is increased by the normal rotation of the pulse motor 32, while it is decreased by the reverse rotation of the pulse motor. A potentiometer 33 is connected with the governor 2a via the link mechanism 31, and this potentiometer 33 detects a governor lever angle corresponding to the rotational speed of the engine 2. The detected value is input to the controller 30 as a control rotational speed Nθ.

Furthermore, the controller 30 is connected with a pressure sensor 34 that detects the secondary pilot pressure P1 generated by the traveling pilot valve 23, corresponding to the pedal operation amount, a temperature sensor 35 that detects temperature of drain oil from the traveling motor 1, a reset switch 36, and a key switch 37 that is turned on/off according to the operation of an engine key, respectively. A power source 38 is connected with the key switch 37, and the electrical power is supplied to the controller 30 in response to the key switch 37 being turned on. Accordingly, the controller 30 implements calculations as will be described later, to control the rotation of the pulse motor 32 by outputting the control signal to the pulse motor 32 and also to control operations of a buzzer 39 and a warning lamp 40 by outputting control signals thereto.

Figure 2:
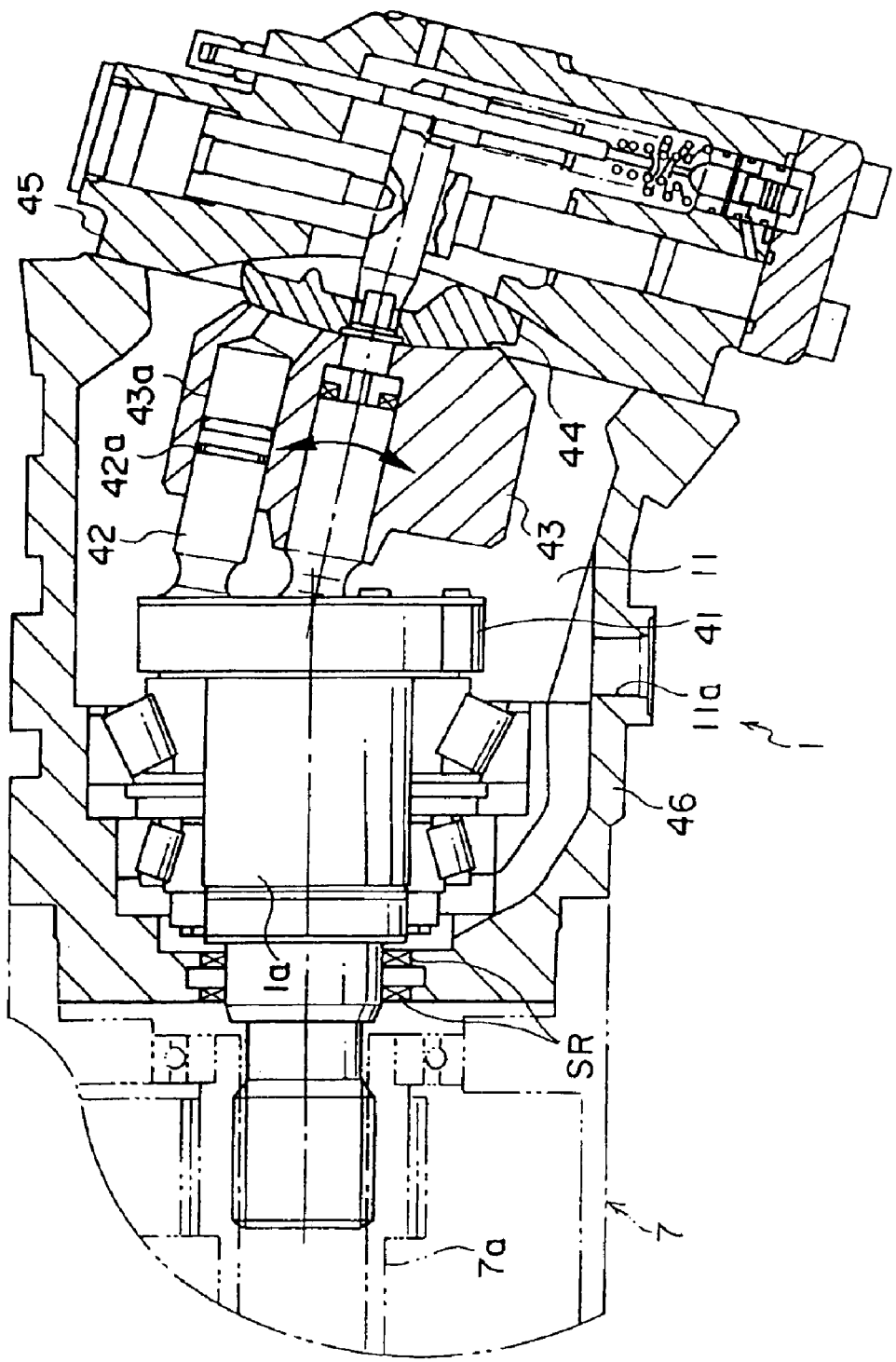
FIG. 2 is sectional view of a traveling motor to which the present invention has been applied.

Next, the construction of the traveling motor 1 will be explained. FIG. 2 is a sectional view of the variable displacement traveling motor 1. As shown in FIG. 2, a plurality of pistons 42 (only one of which is shown in the figure) are connected with a flange 41 of the output shaft 1*a* of the traveling motor 1, along its circumferential direction. The pistons 42 are slidably inserted into oil chambers 43*a* formed in a cylinder block 43 through piston rings 42*a*. The end of the cylinder block 43 comes into contact with a swash plate 44, and their contacting surfaces mutually define a circular cone shape. The swash plate 44 can be swung or inclined together with the cylinder block 43 in the direction of the arrow shown in the figure, and the motor displacement varies according to the swing amount or inclined angle of the swash plate.

An inlet or suction port and an outlet or delivery port of oil, not shown in the figure, are provided in the swash plate and a motor cover 45 which is in contact with the swash plate 44, the suction port and the delivery port extending over half a phase, respectively. And, the pressure oil from main pump 3 flows into the oil chambers 43*a* through the suction port, while the oil from the oil chambers 43*a* flows out to the reservoir through the delivery port. Due to this, the pistons 42 are slid within the oil chambers 43*a*, and, while the swash plate 44 is kept in contact with the cylinder block 43, the output shaft 1*a* of the motor 1 rotates as a unit with the cylinder block 43 and the pistons 42. An input shaft 7*a* of the transmission 7 is connected by splines with the motor output shaft 1*a* so that the rotation of the traveling motor 1 is transmitted to the transmission 7.

At this time, portions of the pressure oil which is supplied to the oil chambers 43*a* from the main pump 3 leak into the drain chamber 11 through gaps between the mutually contacting surfaces of the swash plate 44 and the cylinder block 43, or gaps between the mutually sliding surfaces of the pistons 42 and the oil chambers 43*a*. This leakage oil returns to the reservoir via a drain hole 11*a* which is provided in the bottom of the motor casing 46.

The viscosity of the pressure oil decreases when the pressure oil supplied to the traveling motor 1 becomes a high temperature due to, for instance, the damage of hydraulic components and an oil cooler or the like installed in the upper-structure. As a result, the oil film on the sliding surfaces of pistons 42 may be ruptured, which disturbs a smooth sliding operation of the pistons and may cause wear on such sliding surfaces. The wear on the sliding surfaces may cause the following problems. In concrete term, the piston 42 is caused to stick in (to contact directly with) the cylinder block 43, the cylinder block 43 rotates while being dragged by the piston 42 and then, the gap between the cylinder block 43 and the swash plate 44 becomes partially increased. In other cases, the piston ring 42*a* may be damaged, which causes the gap between the mutually sliding surfaces to become wider. Accordingly, a large amount of pressure oil from main pump 3 flows into the drain chamber 11 through such gaps, and thereby the amount of oil in the drain chamber 11 increases. As a result, the oil in the drain chamber 11 flows into the transmission 7 through seal rings SR. Due to this, great resistance comes to act on the transmission 7 so that the travelling performance of the vehicle deteriorates.

In this embodiment, in order to avoid the above mentioned problems, it is intended to detect the possible causes of the abnormal operation of the traveling motor 1 at the early stage using the temperature sensor 35. That is, the sign of the abnormal operation is to be detected. By detecting the sign of the abnormal operation, a large amount of oil leakage from the hydraulic pump 1 to the drain chamber 11 may be prevented beforehand, and the damage upon the traveling motor 1 and moreover negative consequences from this damage can be suppressed to the minimum.

Figure 3:
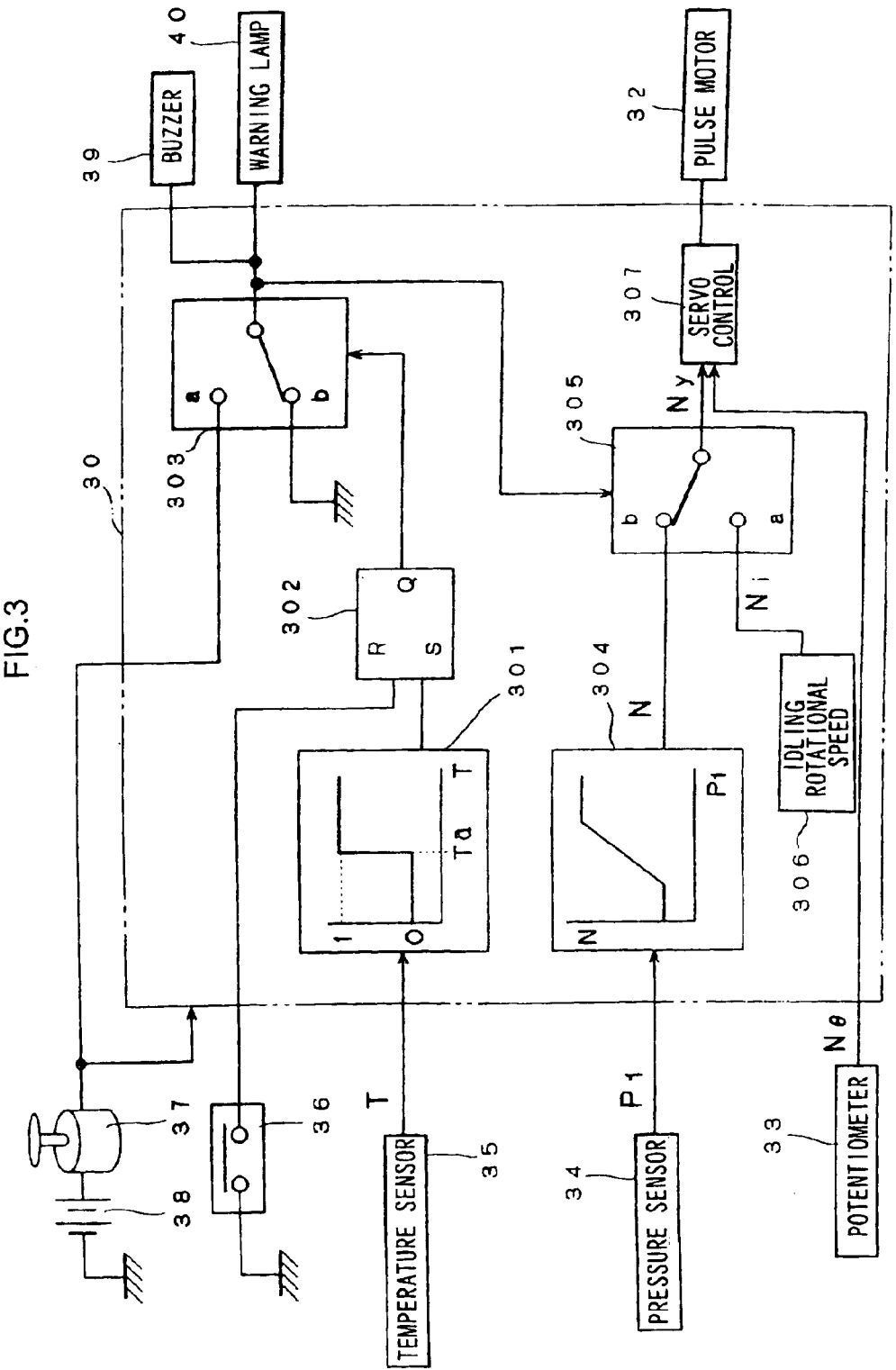
FIG. 3 schematically illustrates the details of a controller which constitutes the failure detection device according to the first embodiment of the present invention.

FIG. 3 is a schematic illustration to explain details of the controller 30. When the engine key switch (ignition key switch) 37 is turned on, the electric power is supplied to the controller 30 to start execution of its processing. A function generator 301 outputs a set signal to a set terminal S of a RS flip-flop 302 when the drain oil temperature detected by the temperature sensor 35 is greater than or equal to the predetermined value Ta. It is to be noted that the predetermined value Ta represents a value of the drain oil temperature that lowers the viscosity of oil and is likely to cause the rupture of the oil film on the sliding surfaces. When the detected temperature T reaches the predetermined value Ta or higher, which shows the sign of the failure of the traveling motor 1, there is great possibility that a large amount of discharged oil from the pump flows into the drain chamber 11.

When the set signal is input to a set terminal S of the flip-flop 302, the flip-flop 302 outputs a high-level signal from its terminal Q to change over a switchover circuit 303 to its contact "a" side. As a result, electrical power is supplied to a buzzer 39 and a warning lamp 40, so that the buzzer emits sound and the buzzer lamp 40 is illuminated.

When a reset switch 36 is turned on, the reset switch 36 outputs a reset signal to a reset terminal R of the flip-flop 302. The flip-flop 302 sets low-level in the terminal Q in response to this reset signal, and the switchover circuit 303 is then switched to its contact "b" side. As a result, the supply of electrical power to the buzzer 39 and the warning lamp 40 is interrupted so that the buzzer sound is brought to a halt and the warning lamp 40 is extinguished.

A function by which the engine speed should increase along with increase of the traveling pilot pressure is set in advance in the function generator 304, as schematically shown in the figure. The function generator 304 sets the rotational speed N corresponding to the detected value P1 from the pressure sensor 34 based upon this function, and outputs this set value N to a switchover circuit 305. The switchover circuit 305 is changed over according to the changeover direction of the switchover circuit 303. In other words, the switchover circuit 305 is switched to its contact "a" side when the switchover circuit 303 is switched to its contact "a" side, while the switchover circuit 305 is switched to its contact "b" side when the switchover circuit 303 is switched to its contact "b" side. Accordingly, the switchover circuit 305 selects either the rotational speed N as set by the function generator 304 or an idling rotational speed Ni which is set in advance in a rotational speed setting device 306, and outputs its selected rotational speed to a servo control section 307 as a target rotational speed Ny. In the servo control section 307, the target rotational speed Ny is compared with the control rotational speed Nθ which corresponds to the amount of displacement of the governor lever as detected by the potentiometer 33, and the pulse motor 32 is controlled so as to bring the control rotational speed Nθ to match the target rotational speed Ny, according to the procedure shown in FIG. 4.

Figure 4:
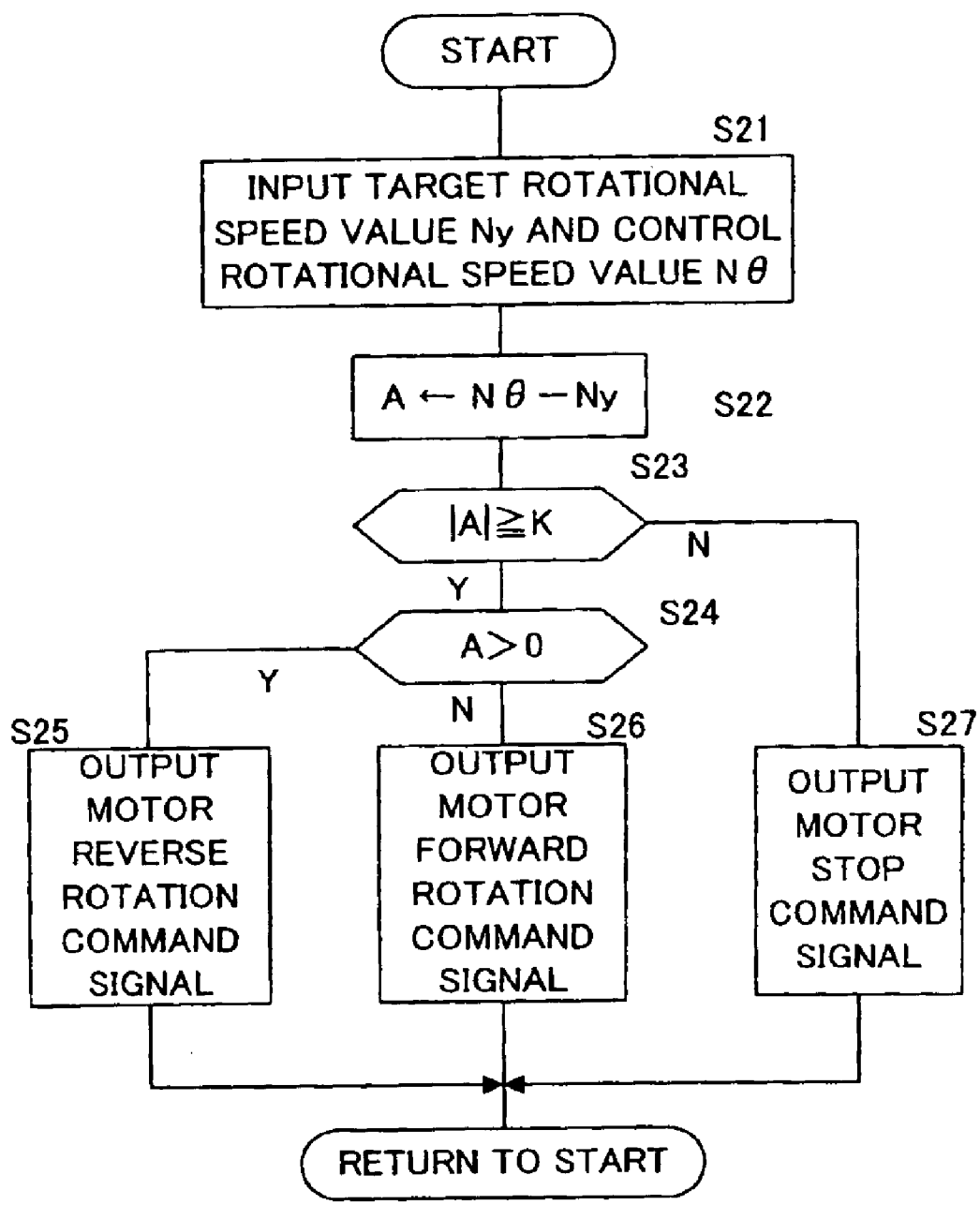
FIG. 4 is a flow chart showing an example of procedure executed by the controller.

Referring to FIG. 4, first in step S21, the rotational speed command value Ny and the control rotational speed Nθ are read in, and then the flow of control proceeds to step S22. In step S22, Ny is subtracted from Nθ, (Nθ−Ny), and the result of this subtraction, i.e. the rotational speed differential A, is stored in a memory. In step S23, it makes a decision as to whether or not $|A| \geq K$, by using a standard rotational speed differential K provided beforehand. If an affirmative decision is made, the flow of control proceeds to step S24 in which a decision is made as to whether or not the rotational speed differential A>0. If A>0, it implies that the control rotational speed Nθ is greater than the rotational speed command value Ny, in other words, the control rotational speed is higher than the target rotational speed, the flow of control then proceeds to step S25 in which a signal for instructing reverse rotation of the motor is output to the pulse motor 32 in order to reduce the engine speed. As a result, the pulse motor 32 is caused to rotate in reverse so that the rotational speed of the engine 2 drops.

On the other hand, if $A \leq 0$, it implies that the control rotational speed Nθ is lower than the rotational speed command value Ny, that is, the control rotational speed is lower than the target rotational value, a signal for instructing normal rotation of the motor is output in order to increase the engine speed, in step S26. As a result, the pulse motor 32 performs normal rotation to increase the engine speed. If a negative decision is made in step S23, the flow of control proceeds to step S27 to output a motor stop signal. Therefore, the rotational speed of the engine 2 is maintained constant. After the appropriate one of the steps S25 to S27 has been executed, the flow of control returns to the beginning of this flow chart.

The outstanding features of the operation of this failure detection device for a hydraulic drive vehicle constructed as described above will now be explained in concrete term.

(1) During normal operation of the traveling motor

While the traveling motor 1 operates normally, the piston 42 slides smoothly and the drain oil temperature remains lower than or equal to the predetermined value Ta. Accordingly, the switchover circuit 303 and the switchover circuit 305 of the controller 30 are switched to their contacts "b" side, respectively, so that the buzzer 39 and the warning lamp 40 is turned off. In this condition, if the forward/backward switchover valve 25 is switched to forward traveling or to reverse traveling, and also the accelerator pedal 22 is stepped upon, the traveling pilot pressure P1 is generated in correspondence to the amount by which the accelerator pedal is operated. The servo control section 307 compares the target rotational speed Ny according to this traveling pilot pressure P1 with the control rotational speed Nθ corresponding to the detected value from the potentiometer 33, and then controls the pulse motor 32 to bring both rotational speeds to agree with each other. Therefore, the engine speed increases in line with the increase of the amount of pedal operation.

(2) When operation of the traveling motor becomes abnormal

When the temperature of the pressure oil supplied to the traveling motor 1 becomes higher, there is a possibility that the oil film on the sliding surfaces of the motor pistons may be ruptured and causes the wear upon the sliding surfaces. When the drain oil temperature rises to the predetermined value Ta, the function generator 301 outputs the set signal to the set terminal of the flip-flop 302. The flip-flop 302 then outputs a high-level signal from its terminal Q to change over a switchover circuit 303 to its contact "a" side. Due to this, the buzzer sound is emitted and also the warning lamp 40 is illuminated. Accordingly, the operator recognizes the sign of the failure of the traveling motor 1, and is able to perform an appropriate operation, e.g. a brake operation, to stop the rotation of the traveling motor 1 in response to an abnormal state of the motor 1. As a result, it is possible to prevent the damage on the traveling motor 1 from happening and moreover to suppress negative consequences from the damage of the motor 1, for instance a copious oil flow into the drain chamber 11, to the minimum.

The switchover circuit 305 is also changed over to the contact "a" side in response to the switchover circuit 303 being changed over. Due to this, the engine speed is lowered to its idling rotational speed Ni regardless of the pedal actuation amount, and the rotational speed of the traveling motor 1 also drops in line with reduction in amount of the delivery oil from the pump. As a result, the traveling motor 1 is automatically prevented from the wear. Since the vehicle is decelerated, the vehicle can be promptly stopped when the brake is operated. Moreover, useless consumption of fuel can be prevented.

The traveling motor 1 can be restarted when the reset switch 36 is operated. In the state in which the drain oil temperature is below the predetermined value Ta, when the reset switch 36 is operated, the terminal Q of the flip-flop 302 is set to low level to switch the switchover circuit 303 to the contact "b" side and then the switchover circuit 305 is switched to the contact "b" side. Due to this, the buzzer sound is stopped and also the warning lamp 40 is extinguished. In other words, the operator is able to stop warning devices from operating at his will. Moreover, it becomes again possible to control the engine speed in accordance with operation of the accelerator pedal. As a result, when the vehicle is to be transported upon a trailer for the repair of the traveling motor 1, it is possible to load the vehicle onto the trailer by driving it under its own power. It should be understood that, instead of operating the reset switch 36, it would also be acceptable to turn off the engine key switch 37.

According to the first embodiment as described above, when the sign of the breakdown of the traveling motor 1 is detected based upon the rise in temperature of the drain oil, the warning, such as buzzer sounds and illumination of the warning lamp 40 is issued. Therefore, the operator is able to perform appropriate operation to stop the motor 1 before damaging the traveling motor 1 and thus it is possible to prevent the damage on the traveling motor 1 from happening. Moreover, the engine speed is lowered to the idling rotation speed Ni to restrict the drive of the traveling motor 1 when it shows the sign of a breakdown of the motor, which makes possible to automatically prevent the traveling motor 1 from being damaged. Since the engine speed is lowered to the idling rotational speed and the vehicle is slowed down, it is possible to pull the vehicle slowly to the shoulder of the road and to stop. Moreover, a useless waste of fuel can be prevented. In addition, the warning is kept issued and restriction upon the traveling of the vehicle is maintained until the reset switch 36 is operated or alternatively the engine key switch 37 is turned off. Therefore, an operator is able to recognize the abnormal state of the traveling motor 1. In the state in which the drain oil temperature is below the predetermined value Ta, if the reset switch 36 is operated or the engine key switch 36 is turned on alternatively, the engine speed can again be increased according to the operation of the accelerator pedal and it is possible to load the vehicle upon the trailer or the like easily.

Second Embodiment

Figure 5:
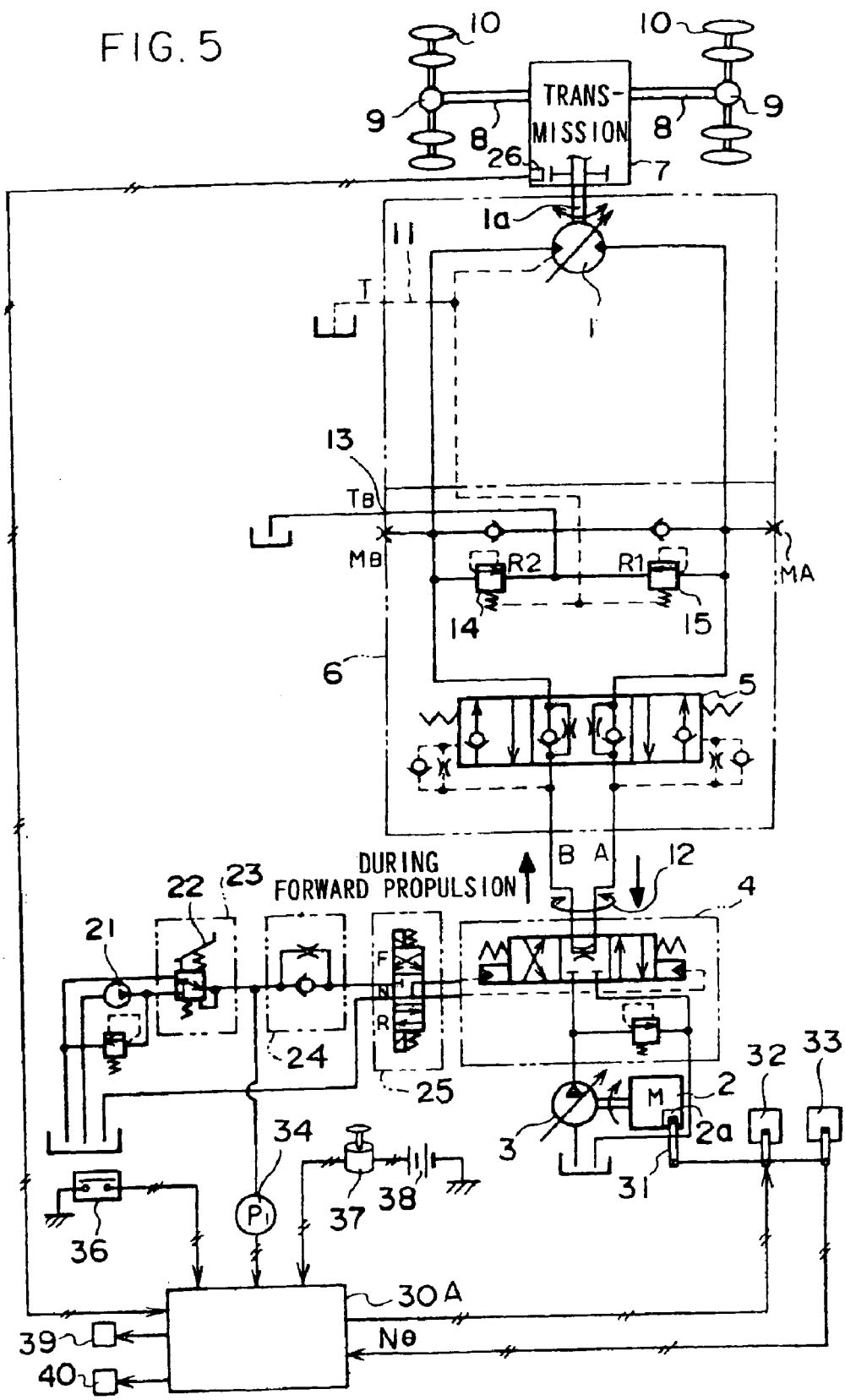
FIG. 5 is a circuit diagram showing the structure of the wheeled hydraulic excavator equipped with the failure detection device for the hydraulic motor according to the second embodiment of the present invention.
Figure 6:
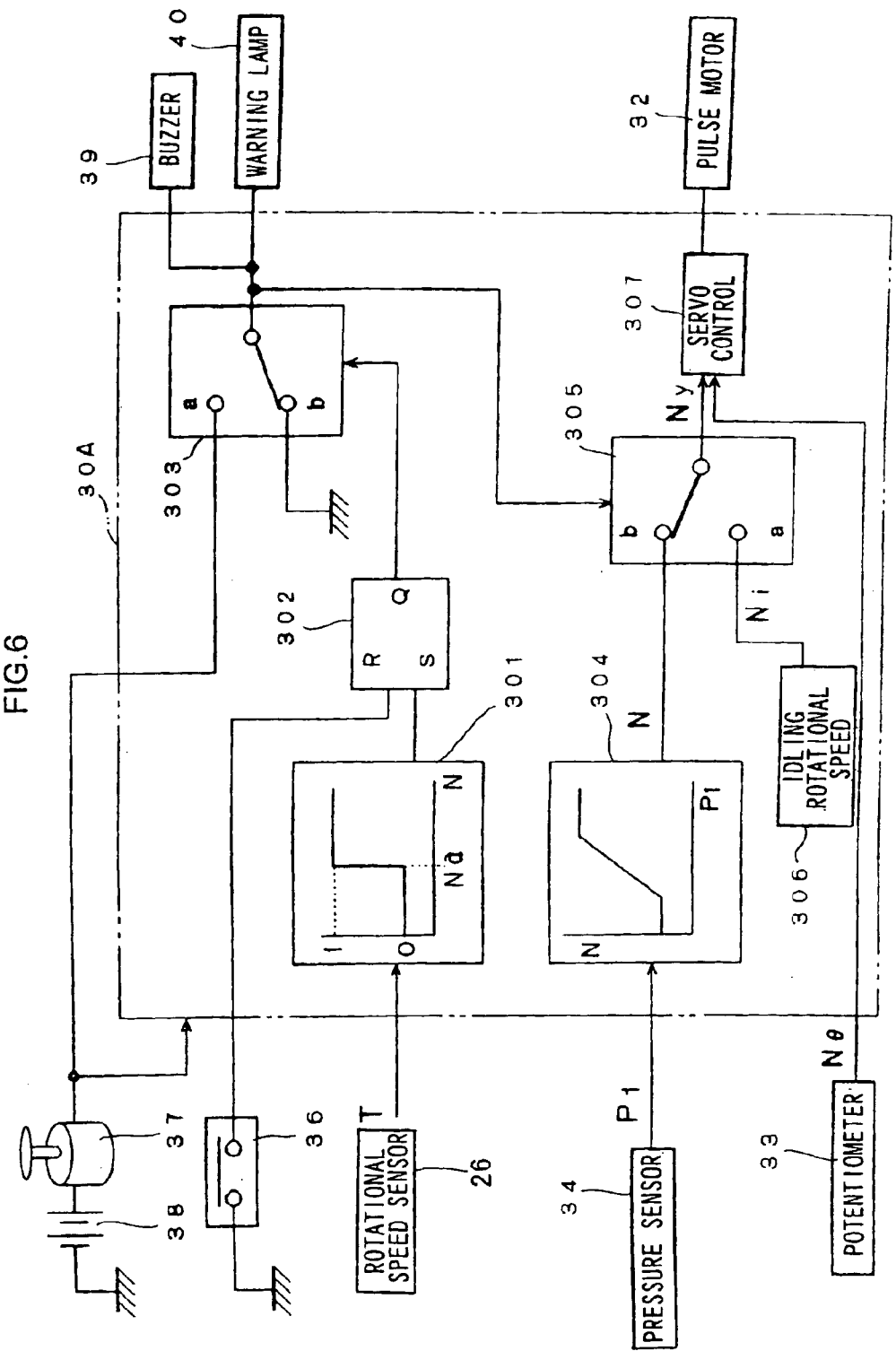
FIG. 6 schematically illustrates the details of a controller which constitutes the failure detection device according to the second embodiment of the present invention.

When the traveling motor 1 over-rotates or rotates at extremely high speed, friction on the sliding surfaces of the pistons 42 increases, which may cause the wear on the pistons 42, and the traveling motor 1 may be damaged. Thus, in the second embodiment, it is determined that the sign of the failure of the traveling motor 1 is detected when the rotational speed of the traveling motor 1 increases to predetermined value Na or higher. The second embodiment of the present invention will now be explained with reference to FIGS. 5 and 6. FIG. 5 is a circuit diagram showing the structure of a wheeled hydraulic excavator which is equipped with a failure detection device according to the second embodiment, and FIG. 6 schematically illustrates details of a controller 30A according to the second embodiment. It should be noted that the same reference numerals are used for elements similar to that of FIGS. 1 and 3, and the explanations will focus on the points different therefrom.

As shown in FIG. 5, a rotational speed sensor 26 that detects a motor rotational speed is provided at the output shaft 1a of the motor. The rotational speed sensor 26 is connected with the controller 30A instead of the temperature sensor 35. As shown in FIG. 6, a function generator 301 outputs a set signal to a set terminal S of a RS flip-flop 302 when the motor rotational speed detected by the rotational speed sensor 26 is higher than or equal to the predetermined value Na. It in to be understood that the predetermined value Na represents a value of the rotational speed at which the wear may be caused upon the pistons 42. Accordingly, the switchover circuits 303 and 305 are switched to their contacts "a" side, and thereby the warning devices are operated. In addition, the engine speed is limited to the idling rotational speed Ni.

In the second embodiment as described above, the sign of the failure of the motor 1 is detected based upon the over-rotation of the traveling motor 1. Therefore, it is possible to predict failure of the traveling motor 1 before the drain oil temperature actually rises and to stop the traveling motor 1 at earlier stage.

Third Embodiment

Figure 7:
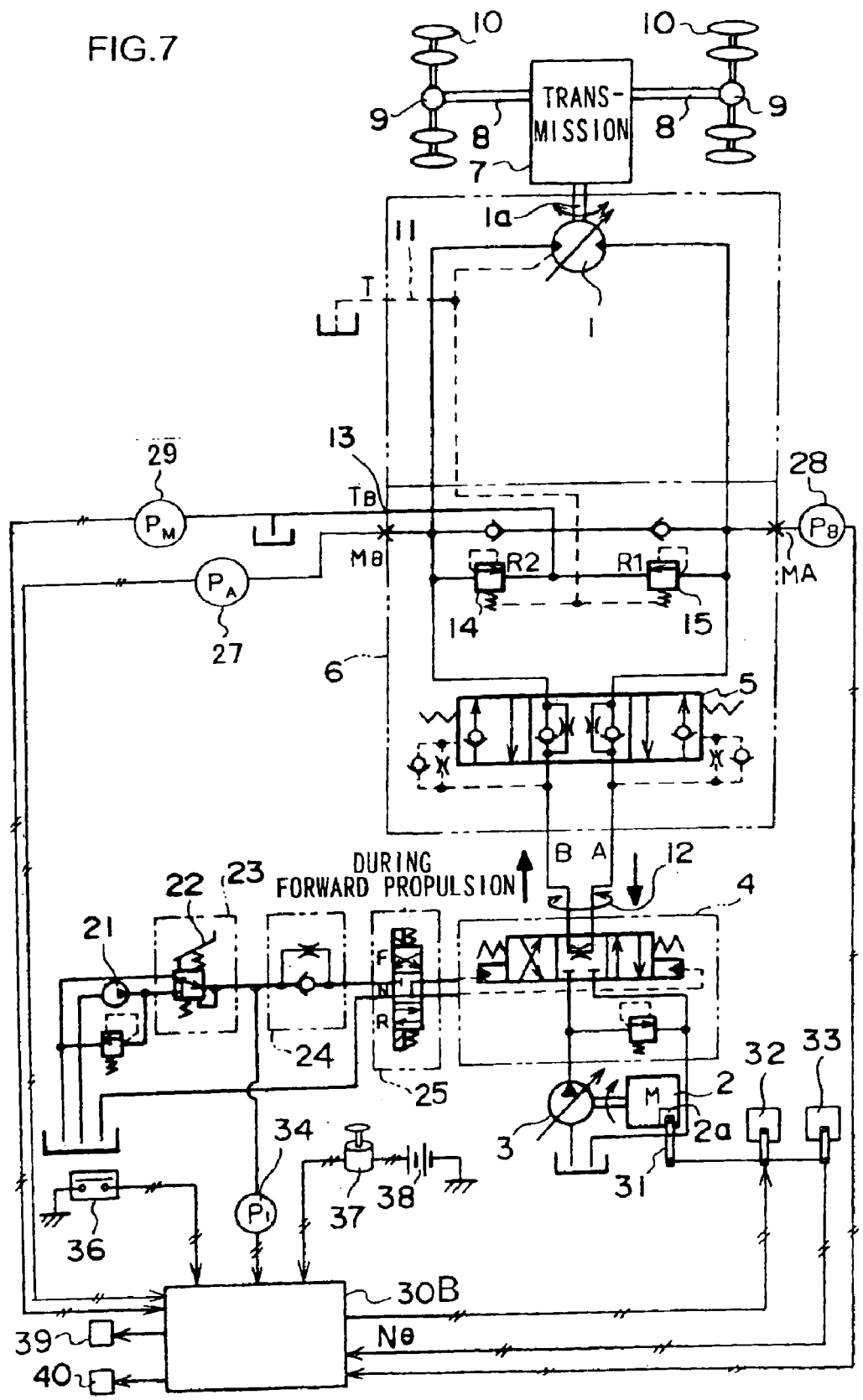
FIG. 7 is a circuit diagram showing the structure of the wheeled hydraulic excavator equipped with the failure detection device for a hydraulic motor according to the third embodiment of the present invention.
Figure 8:
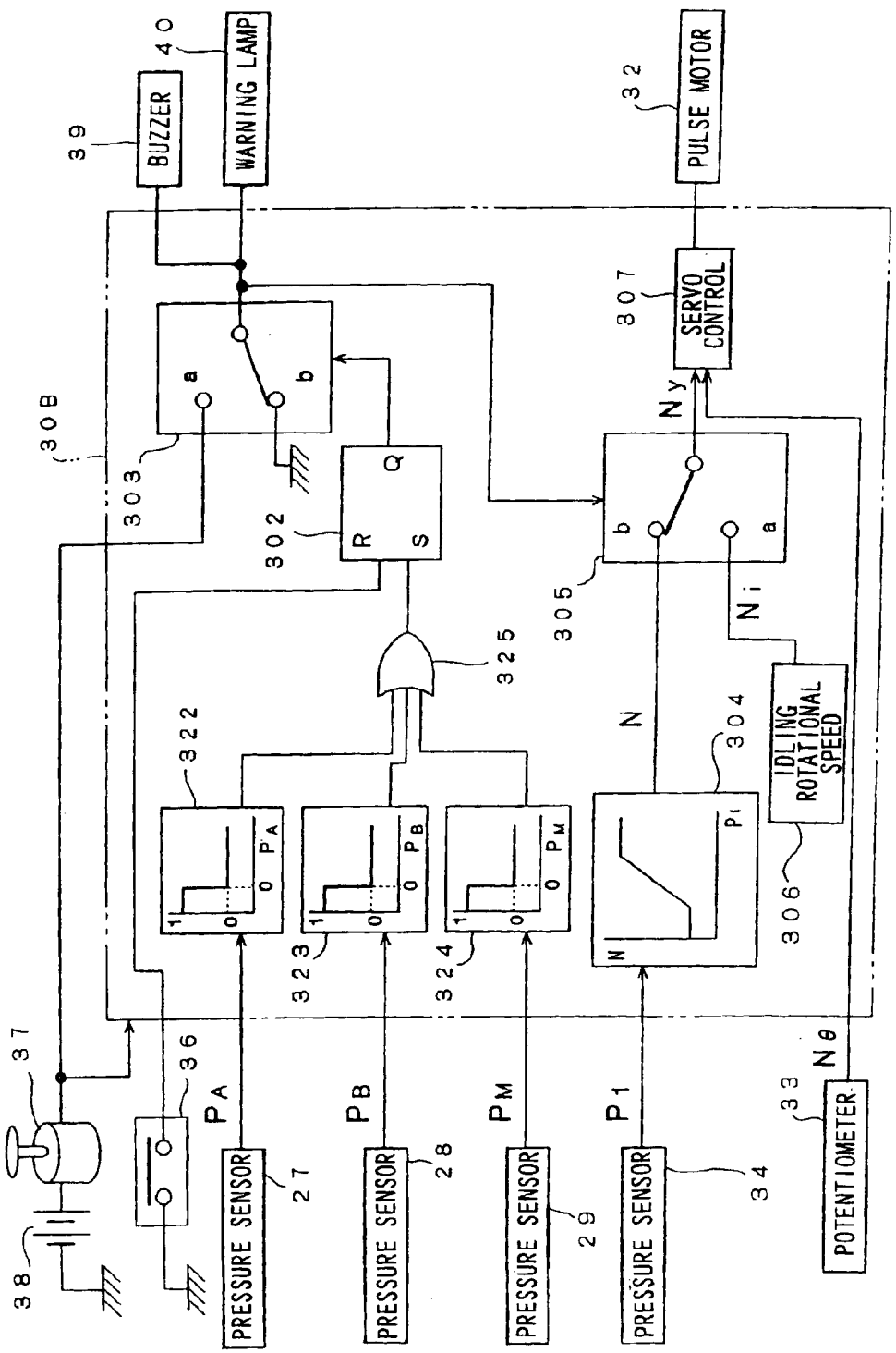
FIG. 8 schematically illustrates the details of the controller which constitutes the failure detection device according to the third embodiment of the present invention.

In the third embodiment, it is determined that the sign of the failure of the traveling motor 1 is detected when cavitation has been generated. The third embodiment of the present invention will now be explained with reference to FIGS. 7 and 8. FIG. 7 is a circuit diagram showing the construction of a wheeled hydraulic excavator which is equipped with a failure detection device according to the third embodiment, and FIG. 8 schematically illustrates the structure of a controller 30B according to the third embodiment. It should be noted that the same reference numerals are used for elements similar to that of FIGS. 1 and 3, and the explanations will focus on the points different therefrom.

As shown in FIG. 7, pressure sensors 27–29 are provided at the inlet port, the outlet port and the make-up port of the traveling motor 1, respectively. These pressure sensors 27–29 each detects motor inlet pressure during normal rotation, reverse rotation and braking operation. As shown in FIG. 8, function generators 322–324 output a high-level signal to a OR gate 325 when the pressure detected by their corresponding pressure sensors 27–29 is negative pressure (equal to 0 or less). When at least one of the detected values of the pressure sensors 27–29 is negative, that is, cavitation has occurred, the OR gate 325 outputs a set signal to a set terminal S of a flip-flop 302. Accordingly, the switchover circuits 303 and 305 are changed to their contact "a" side, and thereby the warning devices are operated and the engine speed is restricted to the idling rotational speed Ni.

According to the third embodiment as described above, since the sign of the breakdown of the motor 1 is detected when the cavitation has occurred, it is possible to stop the cavitation promptly so that problems caused along with generation of the cavitation, such as noise or the like, can be avoided.

Fourth Embodiment

Figure 9:
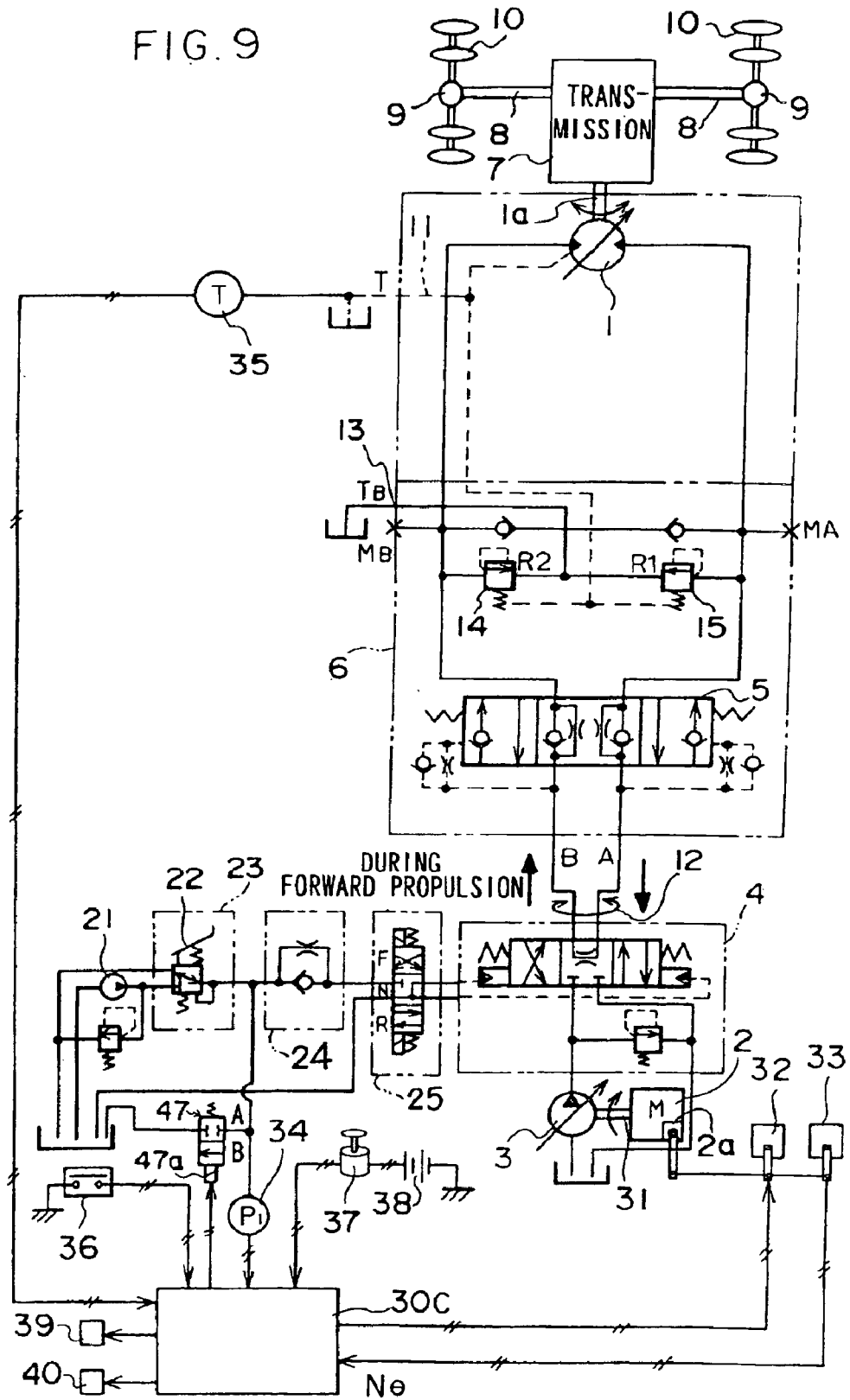
FIG. 9 is a circuit diagram showing the structure of the wheeled hydraulic excavator equipped with the failure detection device for a hydraulic motor according to the fourth embodiment of the present invention.
Figure 10:
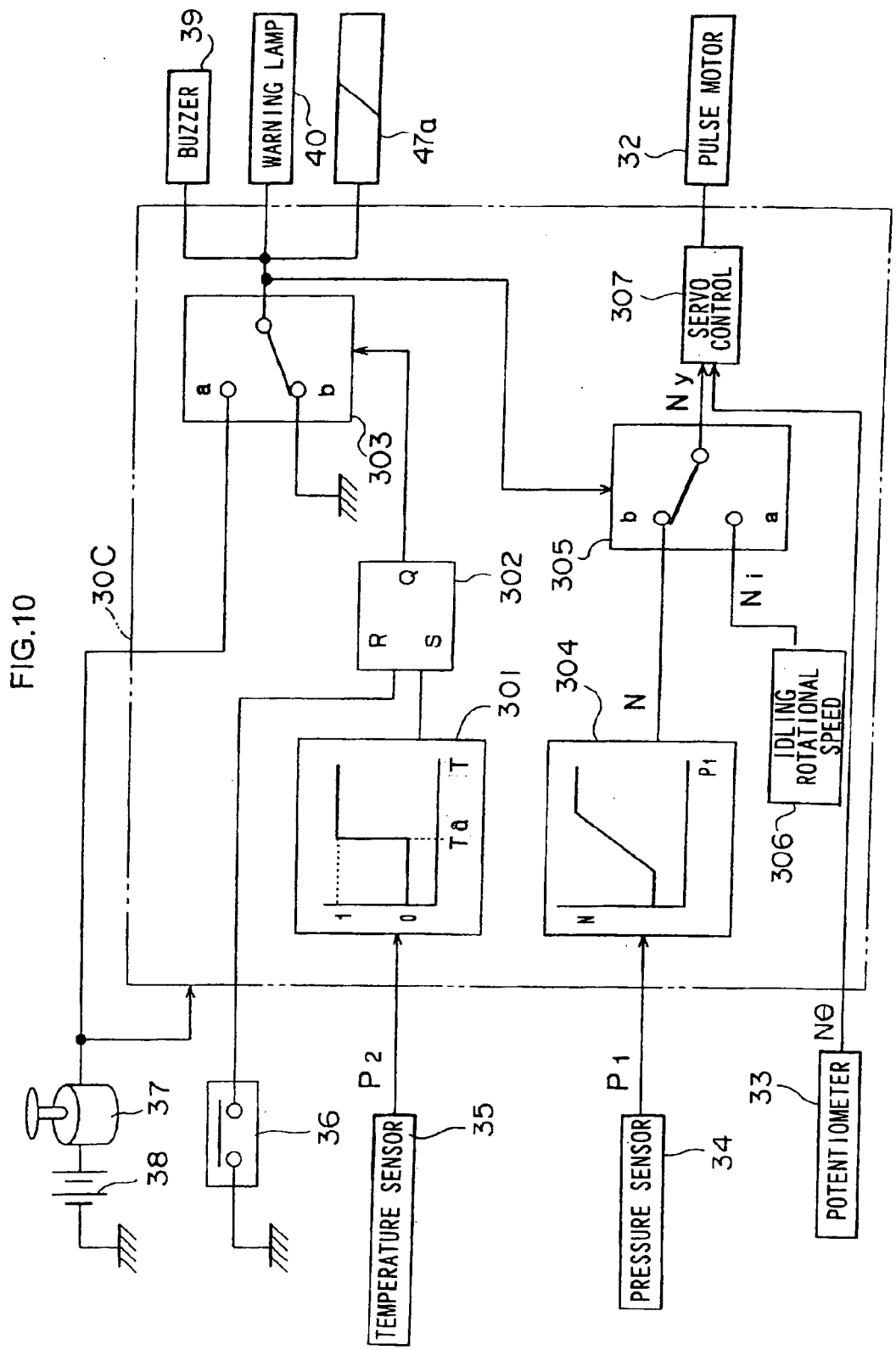
FIG. 10 schematically illustrates the details of the controller which constitutes the failure detection device according to the fourth embodiment of the present invention.

While, in the first embodiment, the engine speed is lowered to the idling rotational speed Ni to restrict the vehicle speed when the sign of the failure of the traveling motor 1 is detected, the vehicle will be stopped in the fourth embodiment. The fourth embodiment of the present invention will now be explained with reference to FIGS. 9 and 10. FIG. 9 is a circuit diagram showing the structure of a wheeled hydraulic excavator equipped with a failure detection device according to the fourth embodiment, and FIG. 10 schematically illustrates details of a controller 30C according to the fourth embodiment. It should be noted that the same reference numerals are used for elements similar to that of FIGS. 1 and 3, and the explanations will focus on the points different therefrom.

As shown in FIG. 9, the line between the traveling pilot valve 23 and the slow-return valve 24 can be connected with the reservoir through a solenoid valve 47. The solenoid valve 47 is controlled by a control signal from the controller 30C. A solenoid 47a of the solenoid valve 47 is connected with the switchover circuit 303 as shown in FIG. 10.

When the drain oil temperature rises to the predetermined value Ta and the switchover circuit 303 is switched to the contact "a" side, the solenoid 47a is excited to switch the solenoid valve 47 to its position B. As a result, the pressure oil having acted on the pilot port of control valve 4 returns to the reservoir via the forward/backward switchover valve 25, the slow-return valve 24 and the solenoid valve 47, and the control valve 4 is driven back to its neutral position. The supply of pressure oil to the traveling motor 1 is thus intercepted, and even if the accelerator pedal 22 is actuated the vehicle is prevented from traveling. In addition, the warning devices start operating, and the engine speed is limited to the idling rotational speed Ni.

While the solenoid 47a is excited, if the reset switch 36 is actuated, the switchover circuit 303 is switched to the contact "b" side. Accordingly, the solenoid 47a is demagnetized, and the solenoid valve 47 is switched to its position A. As a result, the traveling pilot pressure corresponding to the operation of the accelerator pedal is made to act on the pilot port of the control valve 4, and the supply of the pressure oil to the traveling motor 1 becomes possible.

According to the fourth embodiment as described above, when the sign of the failure in the traveling motor 1 is shown, the traveling pilot pressure is made to return to the reservoir by the operation of the solenoid valve 47. As a result, even if the brake is not operated the vehicle stops promptly, and it is possible to suppress damage of the traveling motor 1 and any negative influences which may be caused by this damage to the minimum.

Fifth Embodiment

Figure 11:
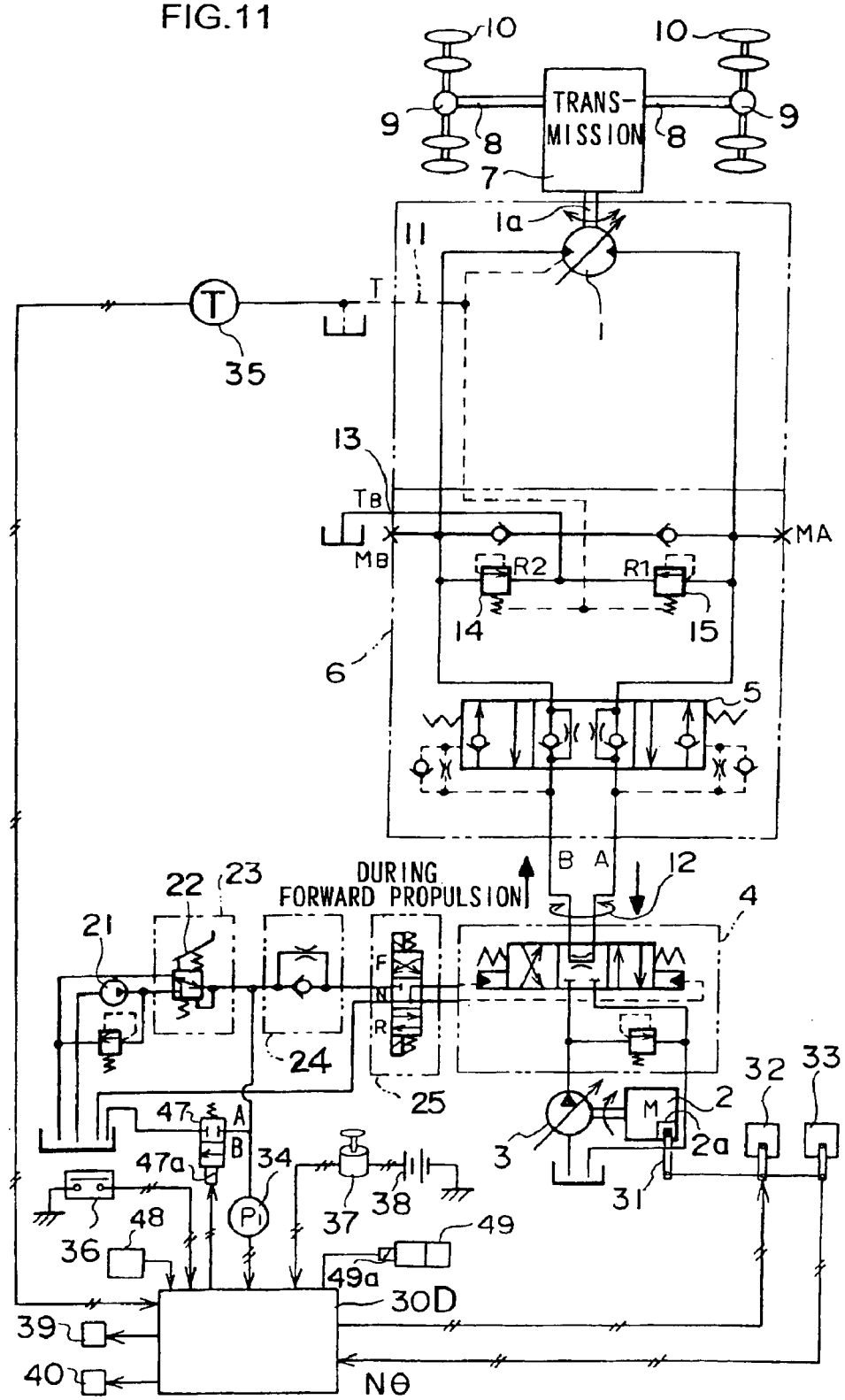
FIG. 11 is a circuit diagram showing the structure of the wheeled hydraulic excavator equipped with the failure detection device for a hydraulic motor according to the fifth embodiment of the present invention.
Figure 12:
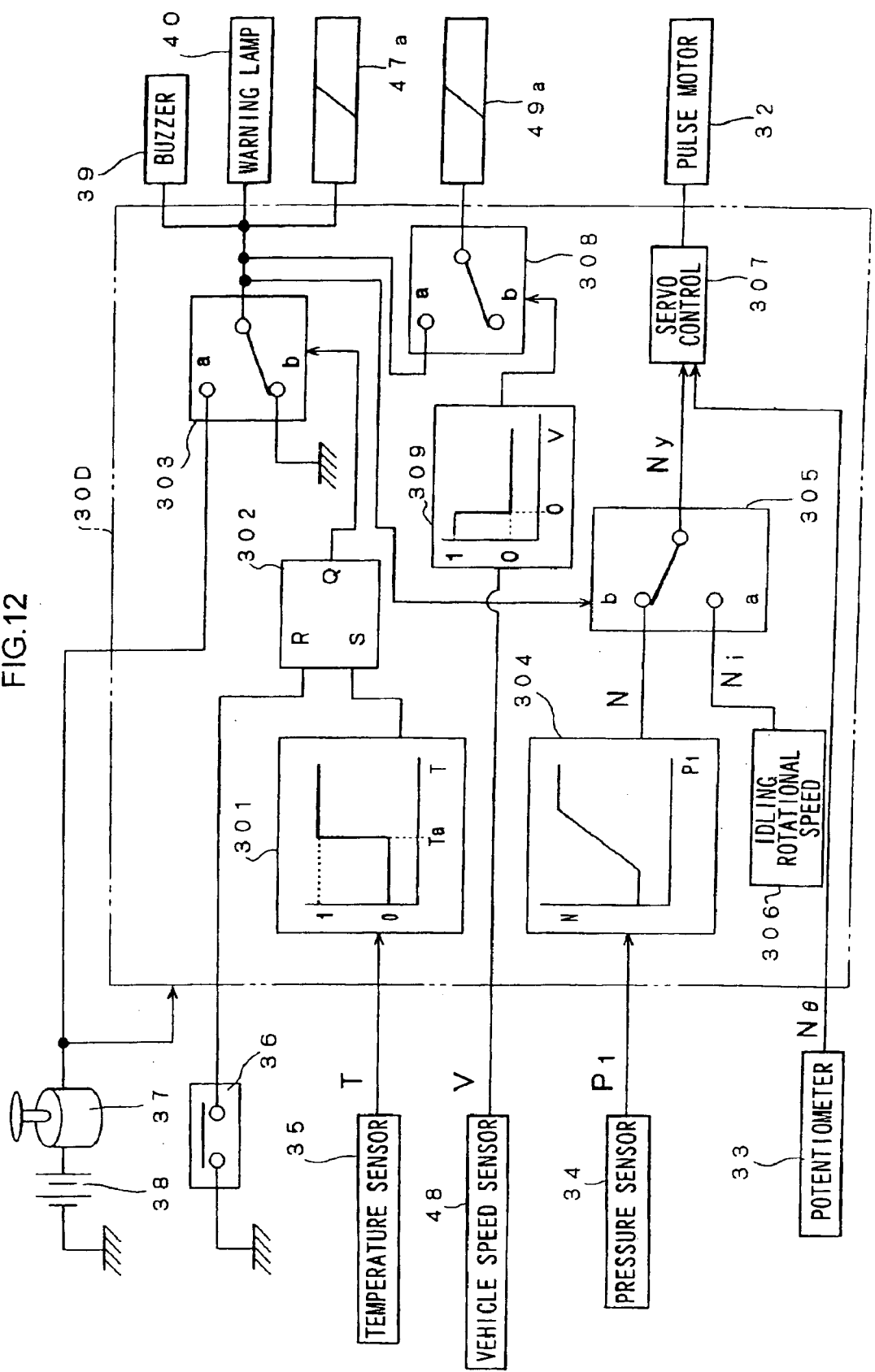
FIG. 12 schematically illustrates the details of the controller which constitutes the failure detection device according to the fifth embodiment of the present invention.

While, in the fourth embodiment described above, the vehicle is stopped when the sign of the failure of the traveling motor 1 is detected, the brake (a parking brake) is additionally applied in the fifth embodiment. The fifth embodiment of the present invention will now be explained with reference to FIGS. 11 and 12. FIG. 11 is a circuit diagram showing the structure of a wheeled hydraulic excavator which is equipped with a failure detection device according to the fifth embodiment, and FIG. 12 schematically illustrates details of a controller 30D according to the fifth embodiment. It should be noted that the same reference numerals are used for elements similar to that of FIGS. 9 and 10, and the explanation will focus on the points different therefrom.

In FIG. 11, a speed sensor 48 that detects the velocity of the vehicle and a solenoid valve 49 for operating the parking brake are additionally provided to the circuit shown in FIG. 9. It should be noted that the parking brake is of a type that is well-known and is operated according to the operation of the solenoid valve 49, and the drawing of which is omitted herein. As shown in FIG.12, a solenoid 49a of the solenoid valve 49 is connected with the switchover circuit 303 via the switchover circuit 308. A function generator 309 switches over the switchover circuit 308 according to a detection value V of the speed sensor 48.

While the vehicle is traveling, the function generator 309 switches the switchover circuit 308 to its contact "b" side as shown in the figure. Accordingly, the solenoid 49a is demagnetized so that the parking brake is released. When the sign of the breakdown of the traveling motor 1 is detected and then the switchover circuit 303 is switched to the contact "a" side, the solenoid 47a of the solenoid valve 47 is excited so that the vehicle stops, as described above. And, the function generator 309 switches the switchover circuit 308 to its contact "a" side when it is detected that the vehicle has stopped, in other words the vehicle speed becomes zero. As a result, the solenoid 49a is excited to operate the parking brake. When the switchover circuit 303 is switched to the contact "b" side in response to the operation of the reset switch 36, the solenoid 49a is demagnetized so that the parking brake is cancelled. It is also possible to provide a timer connected to the function generator 309 so as to switch the switchover circuit 308 to the contact "a" side when a predetermined time period is detected after the vehicle speed becomes zero.

According to the fifth embodiment as described above, when the vehicle is caused to stop according to the sign of the failure of the traveling motor 1, the parking brake is engaged to operate. Therefore, it is possible to maintain the stationary state of the vehicle even when it is on the slope or the like.

Sixth Embodiment

Figure 13:
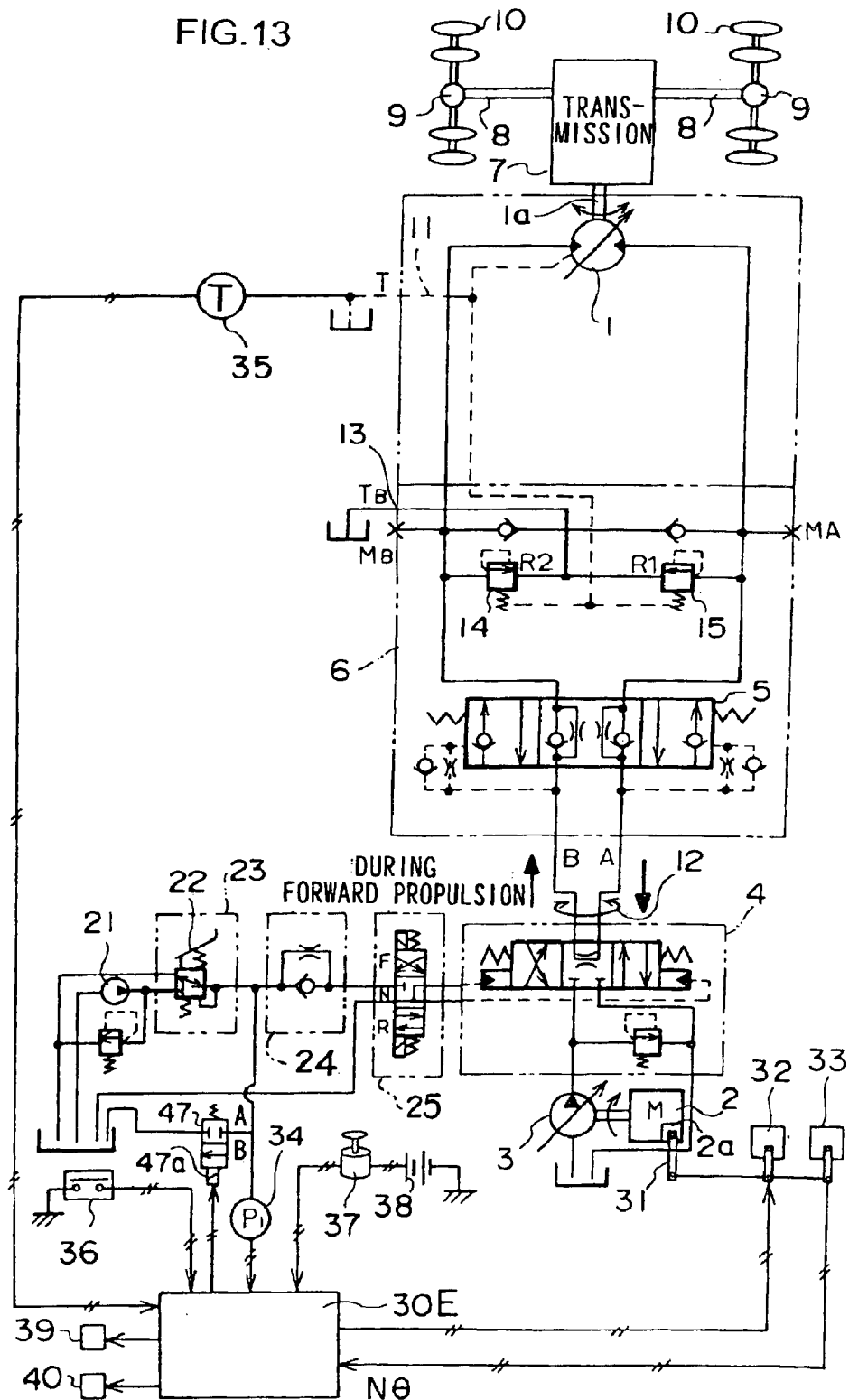
FIG. 13 is a circuit diagram showing the structure of the wheeled hydraulic excavator equipped with the failure detection device for a hydraulic motor according to the sixth embodiment of the present invention.
Figure 14:
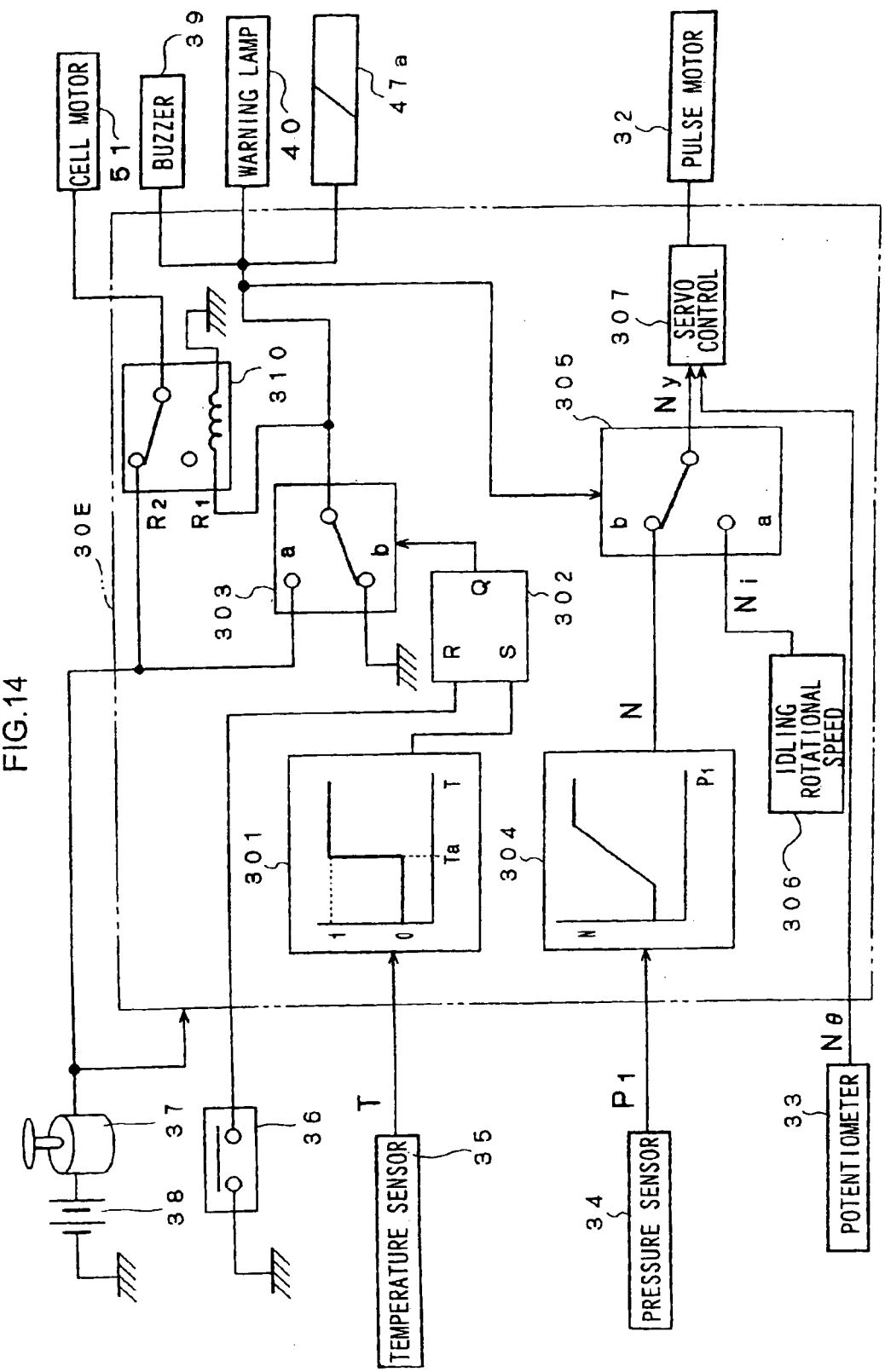
FIG. 14 schematically illustrates the details of the controller which constitutes the failure detection device according to the sixth embodiment of the present invention.

While, in the fourth embodiment, the engine is caused to stop when the sign of the failure of the traveling motor 1 is shown, in addition to this function, the engine 2 is prohibited from restarting in the sixth embodiment. The sixth embodiment of the present invention will now be explained with reference to FIGS. 13 and 14. FIG. 13 is a circuit diagram showing the construction of a wheeled hydraulic excavator which is equipped with a failure detection device according to the sixth embodiment, and FIG. 14 schematically illustrates the structure of a controller 30E according to the sixth embodiment. It should be noted that the same reference numerals are used for elements similar to that of FIGS. 9 and 10, and the explanation will focus on the points different therefrom.

As shown in FIG.13, a starting motor 51 is connected with the controller 30E, and the drive of the starting motor 51 is controlled thereby. As shown in FIG. 14, the engine key switch 37 is connected with the starting motor 51 via a relay 310, and the output terminal of the changeover switch 303 is connected with a coil of the relay 310. Accordingly, when the sign of the breakdown of the traveling motor 1 is detected and the switchover circuit 303 is switched to the contact "a" side, the solenoid 47a is excited to stop the vehicle. In addition, the coil of the relay 310 is supplied with actuating electrical energy so that the relay contact is switched to its contact "R1" side. As a result, the supply of electricity to the starting motor 51 is cut, and it is impossible to start the engine 2 even if the engine key switch 37 is turned on. It should be noted that the parking brake may also be operated when the vehicle has stopped.

In such a state, if the reset switch 36 is actuated, the switchover circuit 303 is switched to the contact "b" side, and the supply of electricity to the coil of the relay 310 is intercepted. The relay contact is thus switched to the contact "R2" side, which makes possible to restart the engine. It should be noted that it would also be possible to restart the engine 2, as an alternative to operation of the reset switch 36, by a repairman, etc. using some apparatuses to supply an external signal of some type. In this manner, it would not be possible for an operator to restart the engine upon his own decision.

According to the sixth embodiment, when the sign of the failure of the traveling motor 1 is detected, the engine 2 can not be restarted. Therefore, an operator will not imprudently restart the engine 2 to drive the vehicle, and it is possible to suppress negative consequences from the damage of the traveling motor 1 to the minimum.

Seventh Embodiment

Figure 15:
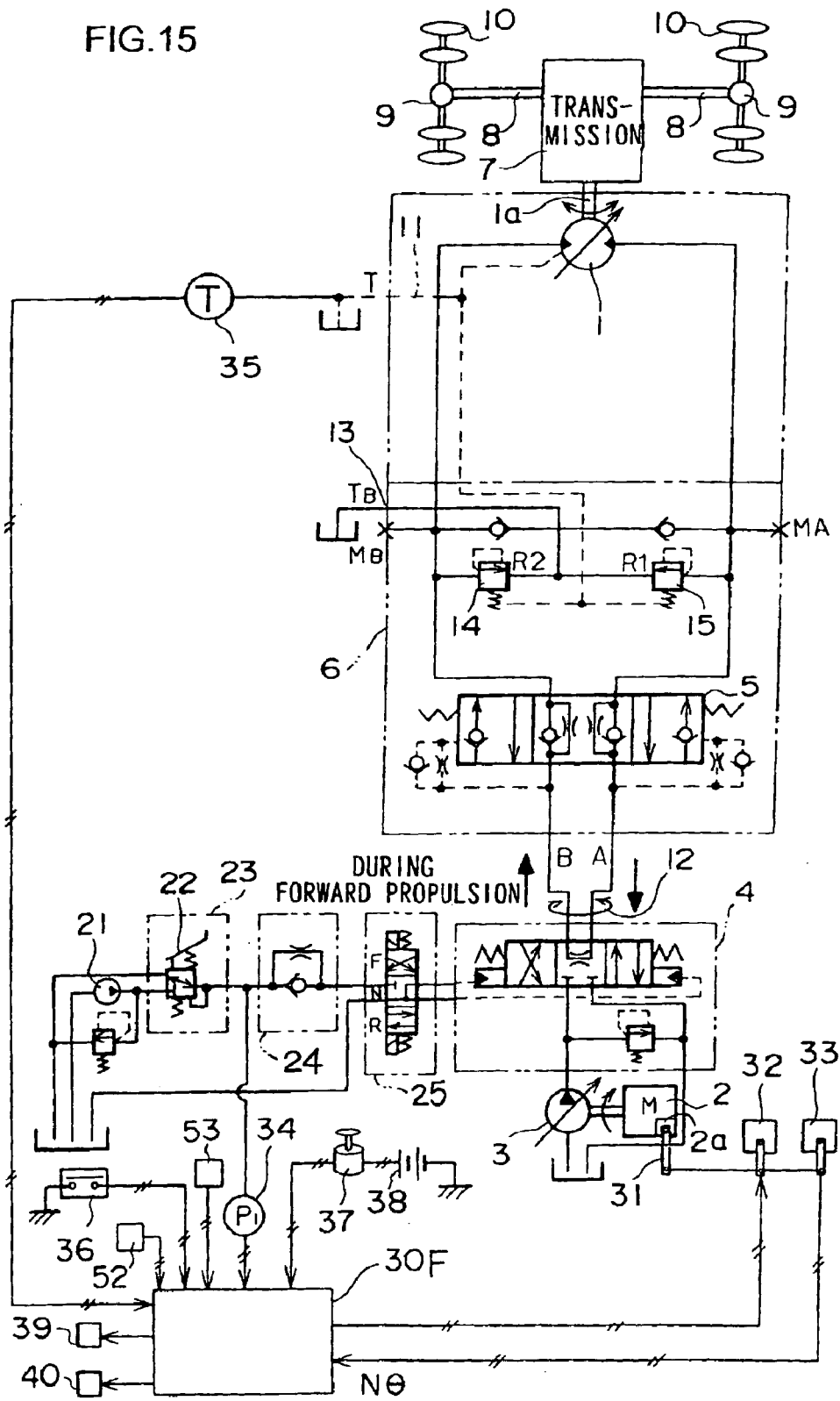
FIG. 15 is a circuit diagram showing the structure of the wheeled hydraulic excavator equipped with the failure detection device for a hydraulic motor according to the seventh embodiment of the present invention.
Figure 16:
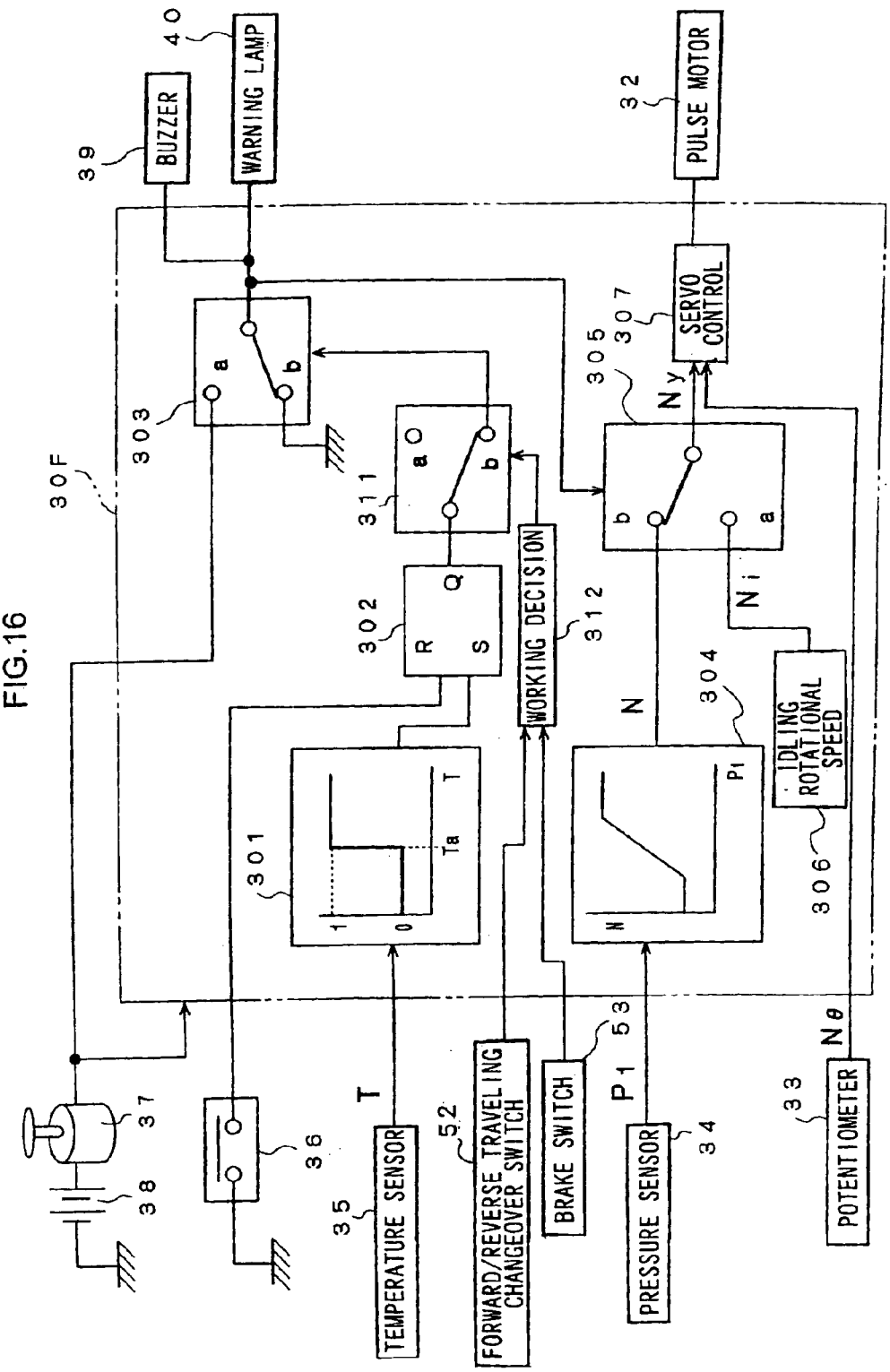
FIG. 16 schematically illustrates the details of a controller which constitutes the failure detection device according to the seventh embodiment of the present invention.

While, in the first embodiment, the engine speed is limited to the idling rotational speed Ni when the sign of the failure of the traveling motor 1 is detected regardless of the traveling state or the working state, the engine speed will be limited only during the traveling state in the seventh embodiment. The seventh embodiment of the present invention will now be explained with reference to FIGS. 15 and 16. FIG. 15 is a circuit diagram showing the structure of a wheeled hydraulic excavator equipped with a failure detection device according to the seventh embodiment, and FIG. 16 schematically illustrates details of a controller 30F according to the seventh embodiment. It should be noted that the same reference numerals are used for elements similar to that of FIGS. 1 and 3, and the explanations will focus on the points different therefrom.

As shown in FIG. 15, a forward/reverse changing switch 52 for outputting a switching command to the forward/reverse switchover valve 25, and a brake switch 53 for outputting an operate command to a work brake not shown in the figures are also connected to the controller 30F. As shown in FIG. 16, a switchover circuit 311 is connected with the terminal Q of the flip-flop 302, and the switchover circuit 311 is switched according to a signal from a work detection section 312. The signals from the forward/reverse changing switch 52 and the brake switch 53 are input to the work detection section 312. The work detection section 312 sets the switchover circuit 311 to the contact "a" side when the forward/reverse switchover valve 25 is in the neutral position and also the work brake is being operated, while in other conditions, the switchover circuit 311 is switched to the contact "b" side.

In this manner, the switchover circuit 311 is switched to the contact "b" while the vehicle is traveling, and if the sign of the failure of the traveling motor 1 is shown, then the switchover circuits 303 and 305 are switched to the contact "a" side to restrict the engine speed to the idling rotational speed Ni. In such a condition, if the forward/reverse switchover valve 25 is set to the neutral position in response to the operation of the forward/reverse changing switch 52, and also the work brake is operated by the operation of the brake switch 53, the switchover circuit 311 is then switched to the contact "a" side. In response to this switchover, the switchover circuits 303 and 305 are both switched to the contact "b" side to cancel the restriction upon the engine speed. As a result, the engine speed can be increased according to the pedal actuation, and it is possible to work as usual. In this condition, if the forward/reverse switchover valve 25 is switched to the forward traveling or the reverse traveling in order to cause the vehicle to travel, the switchover circuits 303 and 305 are both switched to the contact "a" side. As a result, the engine speed is again made to decrease to the idling rotational speed Ni.

According to the seventh embodiment as described above, it is detected as to whether or not the vehicle has started the work operation according to actuations of the forward/reverse changing switch 52 and the brake switch 53. It is possible to continue working in the normal manner even when the traveling motor 1 has broken down since the restriction of the engine speed is released during working. It should be noted that the seventh embodiment can be applied, not only to a system which restricts the engine speed but also, in the same manner, to systems which controls the vehicle travel in other ways, such as by stopping the vehicle traveling, by preventing the engine from restarting, or by engaging the parking brake to operate.

It should be noted, while in the first to seventh embodiments the engine speed is limited to the idling rotational speed Ni when the sign of the failure of the traveling motor 1 is detected, it is also possible, instead of restricting to the idling rotational speed Ni, to set a rotational speed corresponding to the traveling pilot pressure. In this case, the switchover circuit 305 would become unnecessary. Moreover, while, in the fourth to seventh embodiments, the sign of the traveling motor 1 is detected according to increase in the drain oil temperature, it is also possible to detect the sign of the traveling motor 1 based upon the motor rotational speed or the occurrence of the cavitaion in the same manner as the second or third embodiment.

Moreover, although in the first to seventh embodiments, the buzzer sound is emitted along with the illumination of the warning lamp 40 when sign of the failure of the traveling motor 1 is detected, it would also be acceptable to provide one of the warning devices. Furthermore, it would be possible to flash the hazard warning lamps which are provided around the vehicle, in order to arouse the attention around the vehicle. Although, upon detection of the sign of the failure of the traveling motor 1, the provision of warning and the restriction of the vehicle traveling have been performed at the same time, it would be also acceptable to perform only one of them. Moreover, although the driving of the traveling motor 1 is limited, driving of actuators other than the traveling motor 1, such as a swing motor, may as well be restricted. In addition, signs of failure of the actuators other than the traveling motor may also be detected.

INDUSTRIAL APPLICABILITY

While a failure detection device for a hydraulic motor has been explained in terms of application to a wheeled hydraulic excavator by way of example, it would also be possible, in the same manner, to apply the failure detection device of the hydraulic motor according to the present invention to a crawler hydraulic excavator, or to other kinds of hydraulic drive vehicles.

What is claimed is:

1. A failure detection device for a hydraulic motor, comprising:
   a hydraulic pump that is driven by a prime mover;
   a hydraulic motor that is driven by hydraulic oil discharged from the hydraulic pump;
   an abnormality sign detection device that detects a sign indicating that an abnormal operation will occur in the hydraulic motor; and
   a drive restriction device that restricts a driving of the hydraulic motor when the sign of the abnormal operation of the hydraulic motor is detected by the abnormality sign detection device.

2. A failure detection device for a hydraulic motor according to claim 1, wherein:
   the drive restriction switch is reset by actuation of an ignition key switch.

3. A failure detection device for a hydraulic motor according to claim 1, wherein:
   the hydraulic motor is a hydraulic motor for traveling.

4. A failure detection device for a hydraulic motor according to claim 3, wherein:
   the drive restriction device is a rotational speed restriction device that restricts a rotational speed of the prime mover, and the rotational speed restriction device lowers the rotational speed of the prime mover to a predetermined rotational speed when the sign of the abnormal operation of the hydraulic motor for traveling is detected by the abnormality sign detection device.

5. A failure detection device for a hydraulic motor according to claim 3, wherein:
   the drive restriction device is a traveling prevention device that prevents the driving of the hydraulic motor for traveling, and the traveling prevention device prevents the hydraulic motor for traveling from being driven when the sign of the abnormal operation of the hydraulic motor for traveling is detected by the abnormality sign detection device.

6. A failure detection device for a hydraulic motor according to claim 3, further comprising:
   a stopping detection device that detects whether the hydraulic motor for traveling has stopped; and
   a brake device that applies a brake upon the hydraulic motor for traveling when the abnormality sign detection device detects the sign of the abnormal operation of the hydraulic motor for traveling and moreover the stopping device detects that the hydraulic motor for traveling has stopped.

7. A failure detection device for a hydraulic motor according to claim 3, further comprising:
   a restart prevention device that prevents a restarting of the prime mover when the sign of the abnormal operation of the hydraulic motor for traveling is detected by the abnormality sign detection device.

8. A failure detection device for a hydraulic motor according to claim 1, further comprising:
   a warning device that issues a warning when the sign of the abnormal operation of the hydraulic motor is detected by the abnormality sign detection device.

9. A failure detection device for a hydraulic motor according to claim 1, further comprising:
   a reset command switch that resets the drive restriction device.

10. A failure detection device for a hydraulic motor according to claim 1, further comprising:
    a working detection device that detects a working state; and
    a drive restriction control device that disables a drive restriction on the hydraulic motor by the drive restriction device when the working detection device detects the working state.

11. A failure detection device for a hydraulic motor according to claim 1, wherein:
    the abnormality sign detection device detects the sign of the abnormal operation of the hydraulic motor based upon an inlet pressure of the hydraulic motor.

12. A failure detection device for a hydraulic motor according to claim 1, wherein:
    the abnormality sign detection device detects the sign of the abnormal operation of the hydraulic motor based upon a temperature of drain oil from the hydraulic motor.

13. A failure detection device for a hydraulic motor according to claim 1, wherein:
the abnormality sign detection device detects the sign of the abnormal operation of the hydraulic motor based upon a rotational speed of the hydraulic motor.

14. A failure detection device for a hydraulic motor, comprising:
a hydraulic pump that is driven by a prime mover;
a hydraulic motor that is driven by hydraulic oil discharged from the hydraulic pump;
an abnormality sign detection device that detects a sign indicating that an abnormal operation will occur in the hydraulic motor; and
a warning device that issues a warning when the sign of the abnormal operation of the hydraulic motor is detected by the abnormality sign detection device.

15. A failure detection device for a hydraulic motor according to claim 14, further comprising:
a working detection device that detects a working state, and
a warning control device that disables the warning device from issuing the warning when the working detection device detects the working state.

16. A failure detection device for a hydraulic motor according to claim 14, wherein:
the abnormality sign detection device detects the sign of the abnormal operation of the hydraulic motor based upon a temperature of drain oil from the hydraulic motor.

17. A failure detection device for a hydraulic motor according to claim 14, further comprising:
a reset command switch that resets the warning device.

18. A failure detection device for a hydraulic motor according to claim 14, wherein:
the abnormality sign detection device detects the sign of the abnormal operation of the hydraulic motor based upon a rotational speed of the hydraulic motor.

19. A failure detection device for a hydraulic motor according to claim 2, wherein:
the warning device is reset by actuation of an ignition key switch.

20. A failure detection device for a hydraulic motor according to claim 14, wherein:
the abnormality sign detection device detects the sign of the abnormal operation of the hydraulic motor based upon an inlet pressure of the hydraulic motor.

21. A hydraulic drive vehicle, comprising:
a hydraulic pump that is driven by a prime mover;
a hydraulic motor for traveling that is driven by hydraulic oil discharged from the hydraulic pump;
an abnormality sign detection device that detects a sign indicating that an abnormal operation will occur in the hydraulic motor for traveling; and
a warning device that issues a warning when the sign of the abnormal operation of the hydraulic motor for traveling is detected by the abnormality sign detection device.

22. A hydraulic drive vehicle, comprising:
a hydraulic pump that is driven by a prime mover;
a hydraulic motor for traveling that is driven by hydraulic oil discharged by the hydraulic pump;
an abnormality sign detection device that detects a sign indicating that an abnormal operation will occur in the hydraulic motor for traveling; and
a drive restriction device that restricts a driving of the hydraulic motor for traveling when the sign of the abnormal operation of the hydraulic motor for traveling is detected by the abnormality sign detection device.

* * * * *